(12) United States Patent
Rice

(10) Patent No.: US 7,138,788 B2
(45) Date of Patent: Nov. 21, 2006

(54) SWITCH CONTROLLER FOR A POWER CONTROL SYSTEM AND METHOD THEREFOR

(75) Inventor: Benjamin M. Rice, Attleboro, MA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 259 days.

(21) Appl. No.: 10/830,171

(22) Filed: Apr. 23, 2004

(65) Prior Publication Data

US 2005/0237040 A1    Oct. 27, 2005

(51) Int. Cl.
*G05F 1/40* (2006.01)
(52) U.S. Cl. ...................................... 323/268
(58) Field of Classification Search ................ 323/225, 323/268, 271, 282, 283
See application file for complete search history.

(56) References Cited

U.S. PATENT DOCUMENTS

| | | | |
|---|---|---|---|
| 5,672,958 A * | 9/1997 | Brown et al. ................. | 323/269 |
| 6,031,361 A * | 2/2000 | Burstein et al. ............. | 323/224 |
| 6,100,676 A * | 8/2000 | Burstein et al. ............. | 323/283 |
| 6,268,716 B1 | 7/2001 | Burstein et al. | |
| 6,853,169 B1 * | 2/2005 | Burstein et al. ............. | 323/272 |
| 7,002,325 B1 | 2/2006 | Harris et al. ................. | 323/272 |
| 2003/0015996 A1 | 1/2003 | Pohlman et al. | |

OTHER PUBLICATIONS

Product Brief, "Primarion Power Code Digital Multiphase Chipset", copyright 2003 Primarion, Inc. (2 pages).
Product Data/Application Sheet, "Maxim Quick-PWM Slave Controllers for Multiphase, Step-Down Supplies", pp. 1-33, Copyright 2002 Maxim Integrated Products.
Product Data/Application Sheet, "Maxim Quick-PWM Slave Controller with Driver Disable for Multiphase DC—DC Converter", pp. 1-33, Copyright 2002 Maxim Integrated Products.
Linear Technology, Product Application/Data Sheet, LTC1629/LTC1629-PG PolyPhase, High Efficiency, Synchronous Step-Down Switching Regulators, pp. 1-28, copyright Linear Technology Corporation, Milpitas, CA., 1999.

* cited by examiner

*Primary Examiner*—Adolf Berhane
(74) *Attorney, Agent, or Firm*—Robert F. Hightower

(57) ABSTRACT

In one embodiment, a multiphase power control system uses two control lines from a PWM section to control the switch controllers of the system. The two control signals contain power control information in addition to timing information. The switch controller uses the two control signals to facilitate enabling and disabling a power switch of the multiphase power control system.

19 Claims, 4 Drawing Sheets

SWITCH CONTROLLER FOR A POWER CONTROL SYSTEM AND METHOD THEREFOR

BACKGROUND OF THE INVENTION

The present invention relates, in general, to electronics, and more particularly, to methods of forming semiconductor devices and structure.

In the past, the electronics industry utilized various methods and structures to produce multi-phase power supply systems. A multi-phase power supply system typically divided a load of the power supply system into several regions. The power supply controller was also divided into a number of phases or channels. In some cases, each channel was assigned to a particular region of the load. A pulse width modulated (PWM) circuit provided a variable duty cycle signal to control the switching for each channel. All of the channels were summed together to generate a single output voltage. In order to regulate the output voltage, each phase generally had several control signals that were used to synchronize the operation of the channels. In some cases, the control signals were analog signals. These signals were routed from the PWM controller through the switch controllers and other regions of the power control system in order to provide the desired control signals. Often the areas through which the signals were routed were noisy and induced noise into the control signals which determinately affected the accuracy of the power supply system.

Another problem was the number of signals that are required. Typically, several control signals were routed from the PWM controller through the switch controllers and other regions of the power control system. Several more drive synchronization signals often ran from each PWM phase through the region. Such a large number of signals were difficult to build and increased the manufacturing costs of the system.

Accordingly, it is desirable to have a method of forming a power supply control system that minimizes the number of signal routed within the power supply system.

BRIEF DESCRIPTION OF THE DRAWINGS

For simplicity and clarity of illustration, elements in the figures are not necessarily to scale, and the same reference numbers in different figures denote the same elements. Additionally, descriptions and details of well-known steps and elements are omitted for simplicity of the description.

DETAILED DESCRIPTION OF THE DRAWINGS

Figure 1:
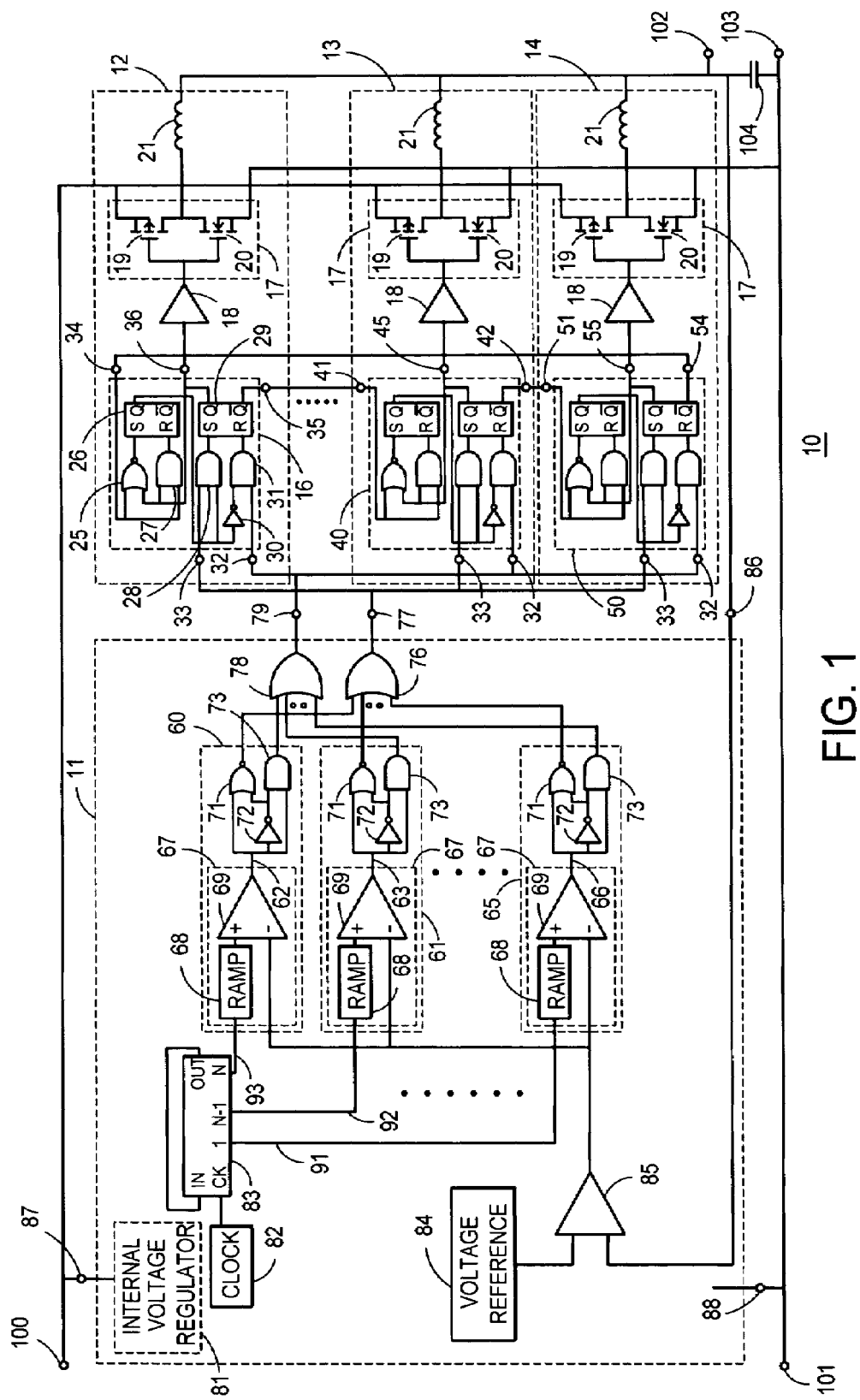
FIG. 1 schematically illustrates an embodiment of a portion of a multiphase power control system in accordance with the present invention.

FIG. 1 schematically illustrates an embodiment of a portion of a multiphase power control system 10. System 10 includes a multiphase power controller 11 that provides control signals to operate a plurality of switch controllers including switch controllers 16, 40, and 50. Switch controllers 16, 40, and 50 minimize the number of signal routings that traverse through the power stages. Typically, switch controllers 16, 40, and 50 are a portion of respective power stages 12, 13, and 14. The plurality of switch controllers that includes switch controllers 16, 40, and 50 may be referred to hereinafter as the plurality of switch controllers or the switch controllers or controllers 16, 40, and 50. Each of power stages 12, 13, and 14 function as a channel that supplies power to a specific area of the load (not shown) that would be connected between an output 102 and a return 103 of system 10. Stages 12, 13, and 14 typically are positioned in different areas within the load that would be receiving power from system 10. As a result, controller 11 generally is positioned a distance away from stages 12, 13, and 14. Power stage 12 includes switch controller 16, a power switch 17, a driver 18, and an inductor 21. Driver 18 receives a drive signal from controller 16 and provides sufficient current to enable and disable switch 17. When switch 17 is enabled, an upper transistor 19 switches inductor 21 to receive the voltage from input 100. When switch 17 is disabled, a lower transistor connects inductor 21 to return 101. Power stage 13 includes a switch controller 40 that is the same as switch controller 16 but has some different external connections. Power stage 14 includes a switch controller 50 that is the same as switch controller 16 but has some different external connections.

Power controller 11 includes a plurality of pulse width modulated (PWM) channels including channels 60, 61, and 65. Controller 11 generally has at least one PWM channel for each switch controller, such as controllers 16, 40, and 50, that would be simultaneously enabled to enable switch 17 during the operation of system 10. Thus, if the maximum number of switch controllers that can be enabled simultaneously is five, then controller 11 has at least five PWM channels. Thus, controller 11 may have N number of PWM channels and system 10 may have more than N number of switch controllers such as controllers 16, 40, and 50. Controller 11 is formed to generate a plurality of PWM drive signals and to use the plurality of PWM drive signals to generate control signals that are representative of the plurality PWM drive signals. As will be seen further hereinafter, controller 11 multiplexes the PWM drive signals from each PWM channel onto two control signal lines that drive the plurality of switch controllers in parallel. The control signals include a first control signal or increment (INC) and a second control signal or decrement (DEC) that are applied to respective outputs 77 and 79 of controller 11. The two control signals contain the PWM control information for enabling and disabling the output transistors and also contain the timing information from the multi-phase clocks. Thus, using two control signals reduces the number of control lines that must be routed through the system. The control signals drive all switch controllers in parallel regardless of the number of switch controllers. Switch controllers 16, 40, and 50 receive the INC and DEC control signals and responsively control a switch drive signal to control the power switch. Forming controller 11 to have at least as many PWM channels as simultaneously enabled switch controllers ensures that controller 11 generates sufficient PWM pulses for each enabled switch controller.

System 10 receives power between a voltage input 100 and a voltage return 101, and supplies an output voltage between output 102 and output return 103. In most embodiments return 103 is commonly connected to return 101. Controller 11 receives power between a voltage input 87 and a voltage return 88 of controller 11. Return 88 typically is connected to return 101 and 103. An internal voltage regulator 81 of controller 11 receives power from input 87 and forms an internal operating voltage that is utilized for supplying power to the elements within controller 11. Although not shown for simplicity of the drawing, regulator 81 typically is connected between input 87 and return 88. A clock 82 generates a serial clock stream or clock signal that is used to provide timing for the different PWM channels of controller 11. A Phase generator 83 receives the clock signal and generates a plurality of overlapping clock phases that are received by PWM channels 60, 61, and 65. Generator 83 has N number of clock phases in order to generate one clock phase for each PWM channel of controller 11. Each PWM channel includes a PWM generator 67 and an edge detector circuit that includes a NOR gate 71, an inverter 72, and an AND gate 73. NOR gate 71 and inverter 72 form a negative edge detector an AND gate 73 and inverter 72 form a positive edge detector. Inverter 72 provides delay to form the pulse from the edge detector. Those skilled in the art will realize that more inverters may be required to create a wider pulse width. Each PWM generator 67 also includes a ramp generator 68 and a ramp comparator 69. An error amplifier 85 of controller 11 receives a feedback signal that is received on a feedback input 86. The feedback signal is representative of the value of the output voltage. Although not shown for simplicity of the invention, the feedback signal generally is derived from the output voltage by a voltage divider or optical network as is well known to those skilled in the art. Amplifier 85 also receives a reference voltage from a voltage reference generator or reference 84 and responsively generates an error signal representative of the value of the output voltage between output 102 and return 103. Ramp generator 68 generates a ramp voltage that is used by comparator 69 in conjunction with the output of amplifier 85 to generate a PWM drive signal. Such error amplifiers, ramp generators, feedback signals, and ramp comparators are well known in the art.

Figure 2:
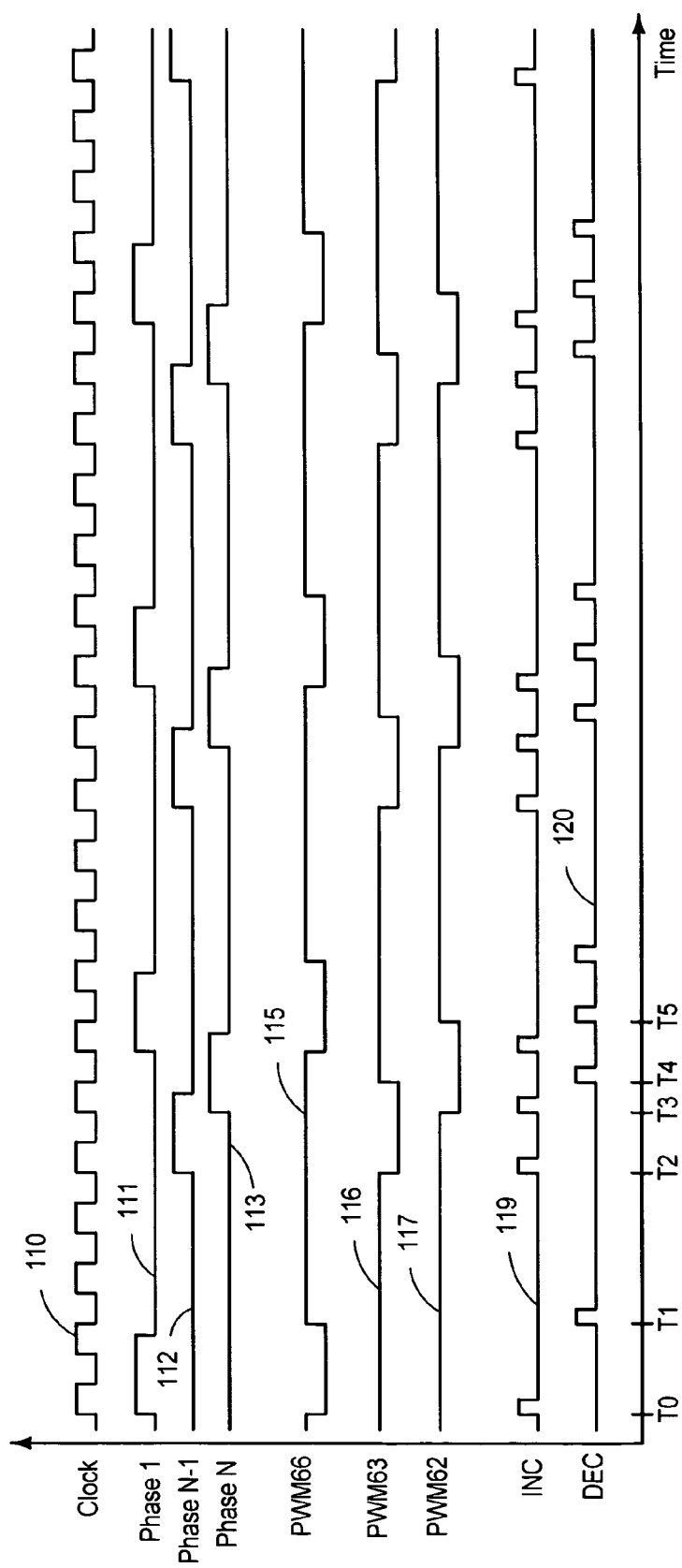
FIG. 2 graphically illustrates waveform plots of some of the signals of the multiphase power control system of FIG. 1 in accordance with the present invention.

FIG. 2 is a graph having plots that illustrate the waveform and the general relationship between some of the signals formed by controller 11 and transmitted to the plurality of switch controllers. The abscissa indicates time and the ordinate represents the amplitude of the signal represented by the plots. A plot 110 illustrates the clock signal from the output of clock 82. A plot 111 illustrates a first clock phase from a first clock phase output 91 of phase generator 83, a plot 112 illustrates an Nth−1 clock phase from an Nth−1 clock phase output 92 of generator 83, and a plot 113 illustrates an Nth clock phase from an Nth clock phase output 93 of generator 83. A plot 115 represents the PWM drive signal on output 66 of first channel 65, a plot 116 represents the PWM drive signal on an output 63 of Nth−1 channel 61, and a plot 117 represents the PWM drive signal on an output 62 of Nth PWM channel 60. A plot 119 illustrates the first control signal on output 77 of controller 11 and plot 120 illustrates the second control signal on output 79 of controller 11. This description has references to both FIG. 1 and FIG. 2. Those skilled in the art will realize that there may be more PWM channels between channels 65 and 61, thus, generator 83 may generate more clock phases than the three phases illustrated in FIG. 2. These other clock phases would have plots that fall in between plots 111 and 112. Accordingly, there would be other PWM drive signals and resulting INC and DEC pulses that are not shown in FIG. 2.

Clock 82 generates a serial clock stream as indicated by plot 110. Phase generator 83 receives the clock stream and generates N number of staggered and overlapping clock phases. Each clock phase is delayed one clock cycle relative to the preceding clock phase to ensure that there is sufficient time between successive INC and DEC pulses to allow the switch controllers to change state. In many embodiments the clock phases have a duty cycle that is less than fifty percent (50%). The embodiment illustrated in FIG. 2 has a duty cycle of approximately twenty percent (20%). Generator 83 can be any of a variety of well-known circuits that receives a clock and generates a plurality of delayed phases. For example, generator 83 can be a shift register that is pre-loaded with a predetermined re-circulating pattern.

Controller 11 uses the clock phases to generate a set of PWM drive signals that are delayed in time relative to each other due to the delay of the clock phases. The embodiment of controller 11 illustrated in FIG. 1 uses trailing edge modulation, so the leading edge of the PWM signal is started at approximately the same time as the rising edge of the received clock phase, and the trailing edge is variable based on the feedback voltage. The operation of both controller 11 and the plurality of switch controllers is also applicable to leading edge and dual edge modulation. Controller 11 uses the leading and trailing edges of the PWM drive signals to create increment and decrement pulses that represent the PWM drive signal and indicate that the output current to output 102 should increase or decrease, respectively. An OR gate 76 multiplexes the increment signals from each PWM channel onto the first control signal or increment (INC) on output 77, and an OR gate 78 multiplexes the decrement signals from each PWM channel onto the second control signal or decrement (DEC) on output 79.

Channel 65 receives the first clock phase illustrated by plot 111 and responsively drives output 66 low at a time T0 as indicated by plot 115. Since output 66 was previously high the output of inverter 72 is low, thus, when output 66 goes low, the low from inverter 72 and the low from output 66 drive the output of gate 71 high. The output of gate 71 remains high until the low from output 66 drives the output of inverter 72 high which then drives the output of gate 71 once again low. This generates a short pulse on the output of gate 71 whenever output 66 transitions from a high to a low. The pulse propagates through gate 76 to output 77 approximately at time T0 as illustrated by plot 119. However, the low going transition on output 66 has no effect on the output of gate 73 as illustrated by plot 120. At a time T1, the ramp of channel 65 has increased to a value that is greater than the error signal from amplifier 85, and comparator 69 drives output 66 high. The high going edge of output 66 is sensed by the positive edge detector of inverter 72 and gate 73 which generates a narrow pulse on the output of gate 73. The pulse propagates through gate 78 to output 79 approximately at time T1 as illustrated by plot 120. At a time T2, channel 61 receives the Nth−1 clock phase illustrated by plot 112 and responsively drives output 63 low as indicated by plot 116. A pulse is created similarly to the pulse that was created at time T0 and the pulse propagates through gate 76 to output 77 approximately at time T2 as illustrated by plot 119. At time T3, Nth channel 60 receives the high transition of the Nth clock phase and responsively drives output 62 low as illustrated by plot 117. A pulse is created similarly to the pulse that was created at time T0 and the pulse propagates through gate 76 to output 77 approximately at time T3 as illustrated by plot 119. At a time T4, the ramp of channel 61 has increased to a value that is greater than the error signal from amplifier 85, and comparator 69 drives output 63 high. The high going edge of output 63 is sensed by the positive edge detector of inverter 72 and gate 73 which generates a narrow pulse on output 79 approximately at time T4 as shown by plot 120. At a time T5, the ramp of channel 60 has increased to a value that is greater than the error signal from amplifier 85, and comparator 69 drives output 62 high. The high going edge of output 62 is sensed by the positive edge detector of inverter 72 and gate 73 which generates a narrow pulse on output 79 approximately at time T5.

The plurality of switch controllers including switch controllers 16, 40, and 50 receive the control signals that represent the PWM drive signals and responsively drive switches 17 to control the output voltage. Each switch controller has a first control input 32 that receives the first control signal and a second control input 33 that receives the second control signal. Switch controllers 16, 40, and 50 also have a control output that provides a third control signal or staging control signal to a third control input or staging input of each switch controller. In order to explain the operation of the switch controllers, the third control input and the control output of switch controllers 16, 40, and 50 are illustrated with different reference numbers. Switch controllers 16, 40, and 50 include staging input 34, 41, and 51, respectively, and the respective control output 35, 42, and 54. The control output and staging inputs are interconnected so that the switch controller topology forms a loop. It should be noted that each switch controller typically includes an internal supply voltage regulator that provides an internal operating voltage for the logic elements within each switch controller. The voltage source that supplies a voltage to the internal supply voltage regulator generally is derived from the power stage in which the switch controller positioned.

In order to determine which switch controller of the plurality of switch controllers is to turn-on or turn-off when receiving one of the control signals, the plurality of switch controllers transmit status information out on the control output and receive status information from another switch controller of the plurality of switch controllers on the staging control input. Each switch controller utilizes the INC and DEC control signals in addition to the staging control signal to determine what action should be taken. Receiving a transition on the staging control input enables or stages each controller to respond to one of the first or second control signals.

Figure 3:
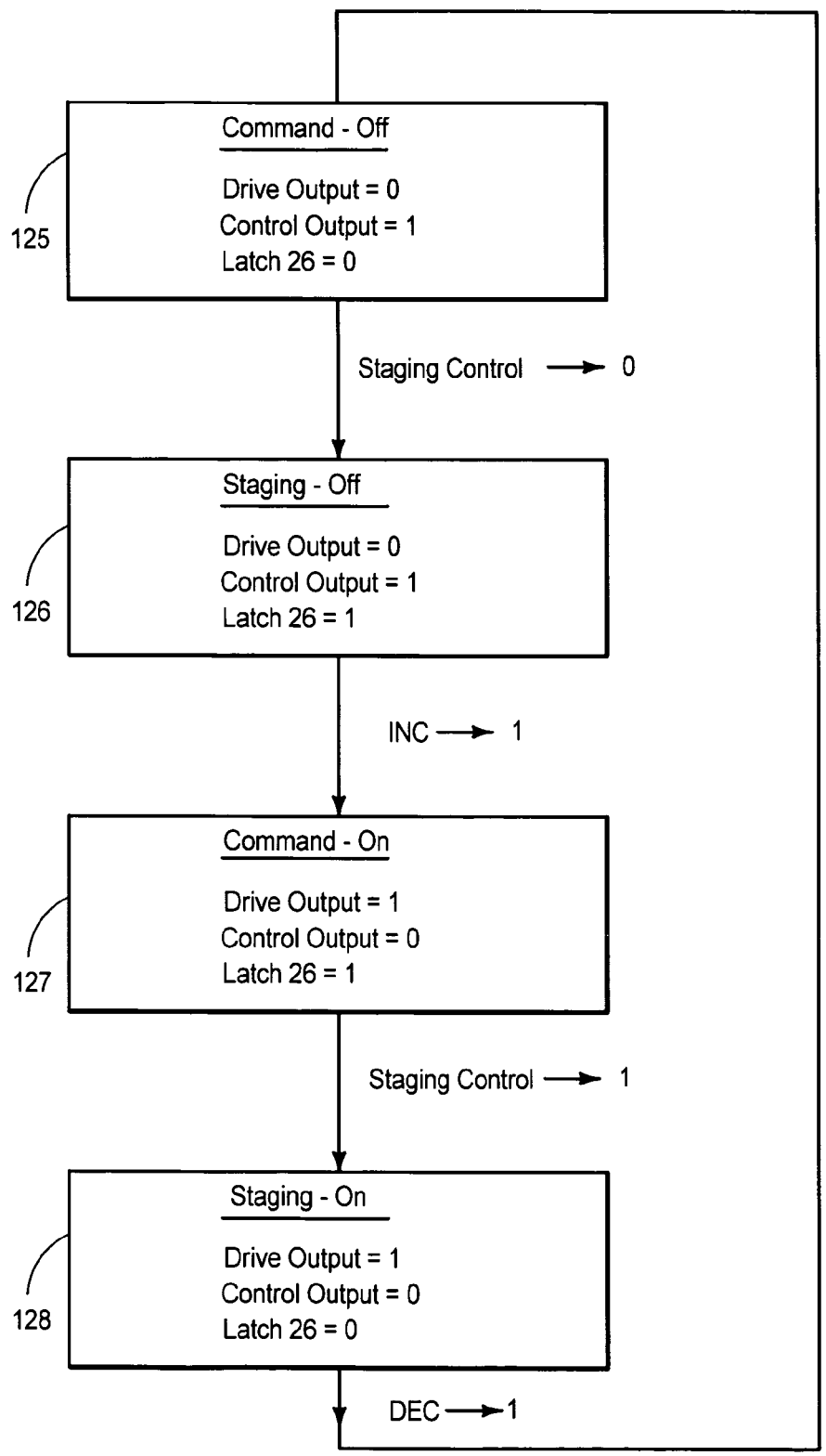
FIG. 3 graphically illustrates a state diagram of some of the states of a switch controller illustrated in FIG. 1 in accordance with the present invention.

FIG. 3 is a flowchart illustrating four different operating states for each of the plurality of switch controllers. For each of the four operating states, the switch controllers respond differently to the received control signals. When a switch controller receives a positive transition on the staging control input the switch controller responsively changes the operating state to a staging state that stages or allows the switch controller to respond to at least one of the INC or DEC control signals. Once one of the INC or DEC control signals is received, the switch controller changes to a command state that is determined by the INC or DEC control signal. The switch controller remains in that command state until receiving another transition on the staging control input.

Each of the switch controllers has a first state illustrated by a command-off state 125 in which the switch controller is off. In this first state, the drive output, for example output, 36 is low in order to disable switch 17, a latch 26 has a Q output that is low, and the control output, for example output 35, is high. In this first state, the switch controller will not respond to any of the INC or DEC control signals that it may receive and may remain in this first state for several cycles of the INC and DEC control signals. The only way to change the state of the switch controller is to receive a one-to-zero transition or negative transition on the staging control input, for example input 34. The negative transition changes the state from the command-off state to a second state.

The second state is illustrated by a staging-off state 126 in which the switch controller is off but is staged to be the next switch controller that is turned-on by an INC pulse. In this state, the switch controller is enabled to respond to an INC control signal but not to a DEC control signal nor to a staging control signal. The only signal that will change the state of the switch controller is an INC control signal. The drive output remains low. Also the control output remains high. The Q output of latch 26 goes high.

When the INC control signal transitions to a one, the state changes to a third state. To transition to the third state, the INC control signal commands the switch controller to turn-on and the state of the switch controller changes to a third state illustrated by a command-on state 127. In this third state, the switch controller is turned-on and the drive output is high in order to enable switch 17, and the Q output of latch 26 is high. Additionally, the control output transitions to a zero to signify to the next sequentially connected switch controller that it should go to the staging-off state in order to be subsequently enabled. In this third state, the switch controller does not respond to any subsequent INC control signals nor does it respond to a DEC control signal. The only signal that the switch controller will respond to is a positive transition on the staging control signal. If the staging control signal is high at the time the switch controller enters the third state, the switch controller falls through the third state to the fourth state.

When the staging control signal transitions to a one, the switch controller transitions to a fourth state illustrated by a staging-on state 128. In the fourth state, the switch controller remains turned-on and the drive output remains high to enable switch 17. The control output remains low, and latch 26 becomes reset in order to identify the fourth state. In this fourth state, the switch controller is staged to be the next switch controller to be disabled by the next DEC pulse. The switch controller does not respond to any subsequent INC control signal nor does it response to a staging control signal. The only signal that the switch controller will respond to is a DEC control signal.

Such a signal causes the switch controller to re-enter the first state that was described previously. When the DEC signal transitions to a one, the switch controller changes to first state 125 and responsively forces the drive output low to disable switch 17. Additionally, the transition to the first state causes the control output to transition to a one to signify to the next sequentially connected switch controller that it should go to the staging-on state in order to be subsequently disabled. If the staging control signal is low at the time the switch controller re-enters the first state, the switch controller falls through the first state to the second state.

In order to facilitate the operation described by the state diagram, control input 33 of switch controller 16 is connected to receive the INC control signal and to a first input of an AND gate 28. A second input of gate 28 is connected to an input of an inverter 30 and to a Q output of latch 26. An output of gate 28 is connected to a set input of a latch 29. An output of inverter 30 is connected to a first input of an AND gate 31. A second input of gate 31 is connected to input 32 to receive the DEC control signal, and an output of gate 31 is connected to a reset input of latch 29. A Q output of latch 29 is commonly connected to drive output 36, to a first input of an AND gate 27, and to a first input of a NOR gate 25. A second input of gate 27 is commonly connected to a second input of NOR gate 25 and to input 34 to receive the staging control signal. An output of gate 27 is connected to a reset input of latch 26. An output of gate 25 is connected to a set input of latch 26. A Q bar output of latch 29 is connected to control output 35. Each switch controller 40 and 50 have the same connections as controller 16 except that respective inputs 41 and 51 replace input 34, respective outputs 42 and 54 replace output 35, and outputs 45 and 55 replace output 36.

Although system 10 shows three switch controllers, it can be seen that other switch controllers may be in-between controllers 16 and 40. The control output of each switch controller would be connected to the staging control input of the next switch controller in order to form a loop that interconnects all of the switch controllers. Output 35 of controller 16 is connected to the staging control input of the next sequential switch controller that is used by system 10. Input 41 of switch controller 40 is connected to receive the control output of the next previous switch controller. Control output 42 of switch controller 40 is connected to staging control input 51 of switch controller 50. Control output 54 of switch controller 50 is connected to input 34 of switch controller 16.

Figure 4:
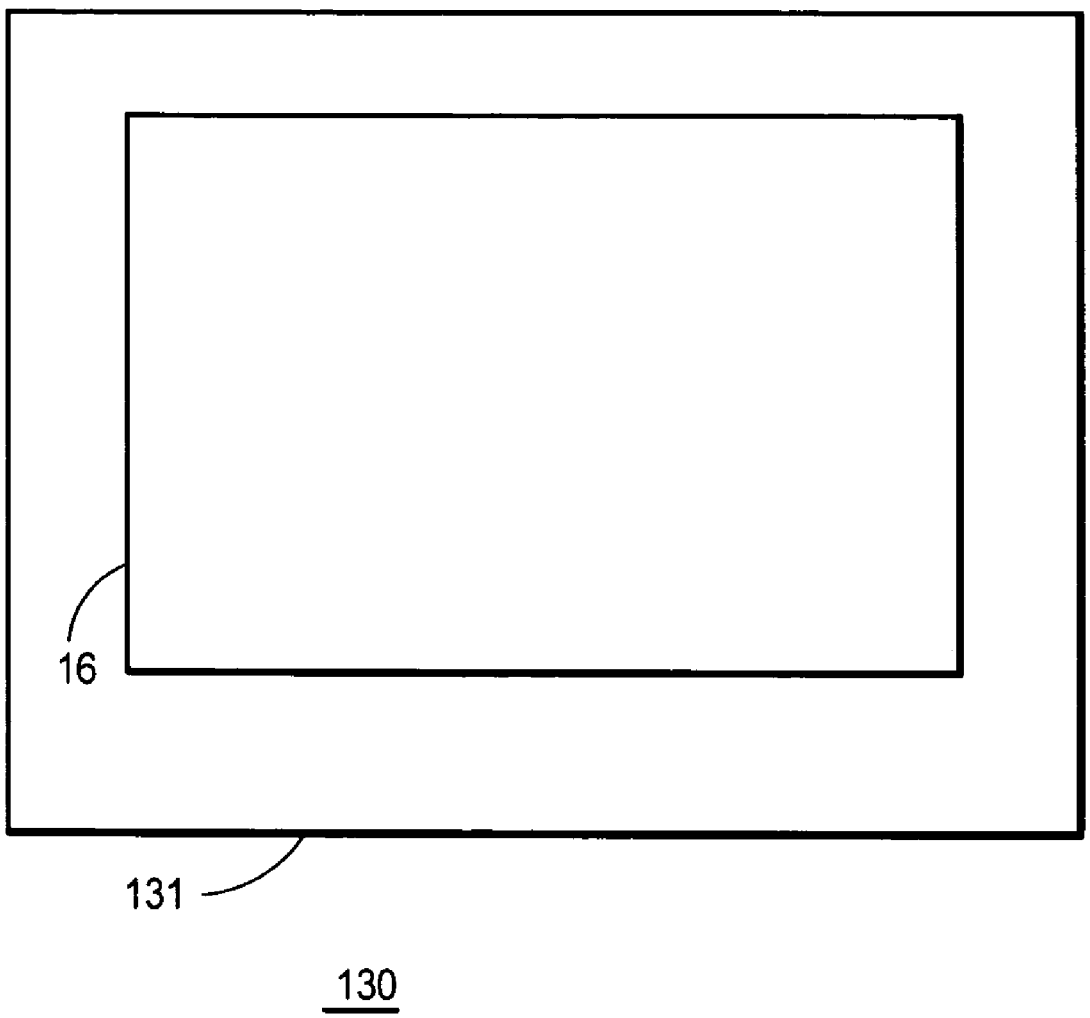
FIG. 4 illustrates an enlarged plan view of an embodiment of a semiconductor device that includes a switch controller of the multiphase power control system of FIG. 1 in accordance with the present invention.

FIG. 4 schematically illustrates an enlarged plan view of a portion of an embodiment of a semiconductor device 130 that is formed on a semiconductor die 131. Switch controller 16 is formed on die 131. Die 131 may also include other circuits that are not shown in FIG. 4 for simplicity of the drawing. For example, driver 18 may be formed on die 131 along with controller 16. Controller 16 and device 130 are formed on die 131 by semiconductor manufacturing techniques that are well know to those skilled in the art.

In view of all of the above, it is evident that a novel device and method is disclosed. Included, among other features in one embodiment, is forming the switch controller to receive two control signals that are routed from the PWM controller. Using only two control signals minimizes the number of lines routed from the PWM controller through the switch controllers and other regions of the power control system thereby minimizing routing area and reducing system costs. Since the control signals are digital, system operation is improved. Using two such control signals facilitates minimizing the frequency to a value no greater than the switching rate of the power stages.

While the invention is described with specific preferred embodiments, it is evident that many alternatives and variations will be apparent to those skilled in the semiconductor arts. PWM controller 11 is illustrated in a particular embodiment in order to describe the switch controllers and describe the operation of system 10. PWM controller 11 may be formed with other embodiments as long as the control signals are formed to represent the PWM drive signals generated by the PWM controller. Additionally, the switch controllers may have other logical embodiments as long as the switch controllers receive the control signals that are representative of the PWM drive signals and responsively enable and disable the switches. Also, the staging control signals may have other signal formats. For example the switch controllers may be formed to respond to pulses instead of edges, or may be level sensitive. Further the method of multiplexing the PWM drive signals into the control signals may use a different format as long as the control signals are representative of the PWM drive signals. For example, the control signals may be toggled from one state to another for each respective edge of the PWM drive signals. Such a scheme reduces the frequency of the control signals. Each switch controller would require more logic, such as edge detectors, to decode the format.

The invention claimed is:

1. A method of forming a switch controller comprising:
forming the switch controller to receive a first control signal and responsively generate a drive signal operable to enable a power switch and to receive a second control signal and responsively generate the drive signal operable to disable the power switch wherein the first control signal and the second control signal are representative of a PWM drive signal;
forming the switch controller to generate a control output responsively to the first control signal and the second control signal; and
forming the switch controller to receive a third control signal from another switch controller.

2. The method of claim 1 further including forming the switch controller to receive the third control signal and responsively change a state of the switch controller.

3. The method of claim 2 wherein forming the switch controller to receive the third control signal includes forming the switch controller to ignore the first control signal and the second control signal until receiving a transition on the third control signal.

4. The method of claim 1 wherein forming the switch controller to receive the first control signal and responsively generate the drive signal operable to enable the power switch and to receive the second control signal includes forming the switch controller to receive the first and second control signals from a PWM controller.

5. The method of claim 1 wherein forming the switch controller to receive the first control signal and responsively generate the drive signal operable to enable the power switch and to receive the second control signal includes forming the switch controller having a first state operable to receive a first control input signal and responsively control a switch drive signal suitable to enable the power switch, having a second state operable to receive a second control input signal and responsively control the switch drive signal to disable the switch, having a third state operable to receive the third control signal and responsively enable the switch controller to change from the third state to one of the first state or the second state.

6. The method of claim 5 wherein forming the switch controller having the first state includes forming the switch controller having the third state operable to remain in the third state upon receiving either the first control signal or the second control signal and not the third control signal.

7. A switch controller comprising:
a first output operable for controlling a power switch; and
control logic having a first state operable to receive a first control signal and responsively control the first output to enable the power switch, having a second state operable to receive a second control signal and responsively control the first output to disable the power switch, having a third state operable to receive a third control signal and responsively change the third state to one of the first state or the second state, wherein the switch controller is configured to operate in a loop configuration with another switch controller.

8. The switch controller of claim 7 wherein the third control signal does not change the first state or the second state.

9. The switch controller of claim 7 wherein the power switch is a power transistor.

10. The switch controller of claim 7 wherein the first control signal is representative of a first state of a PWM signal and the second control signal is representative of a second state of the PWM signal.

11. The switch controller of claim 10 further including the switch controller operable to receive the first and second control signals from a PWM controller.

12. The switch controller of claim 7 wherein the switch controller is operable in a loop configuration with a plurality of switch controllers and wherein the switch controller receives the third control signal from the another switch controller of the plurality of switch controllers.

13. The switch controller of claim 12 further including a first control input of the plurality of switch controllers coupled to receive the first control signal and a second control input of the plurality of switch controllers coupled to receive the second control signal.

14. The switch controller of claim 7 further including a control output that is responsive to the first control signal and the second control signal but not the third control signal.

15. The switch controller of claim 14 wherein having the third state operable to receive the third control signal and responsively change the third state to one of the first state or the second state includes having the third state operable to receive a first state of the third control signal and responsively change the third state to the first state, and having the third state operable to receive a second state of the third control signal and responsively change the third state to the second state.

16. A method of operating a power control system comprising:
   coupling a first switch controller to drive a first power switch;
   coupling a second switch controller to drive a second power switch;
   driving in parallel a first control input of the first switch controller and a first control input of the second switch controller with a first control signal;
   driving in parallel a second control input of the first switch controller and a second control input of the second switch controller with a second control signal; and
   driving a third control input of the first switch controller with first control output of the second switch controller.

17. The method of claim 16 further including receiving the first control signal from a PWM section of the power control system wherein the first control signal is representative of a first state of a PWM signal generated by the PWM section.

18. The method of claim 17 further including receiving the second control signal from the PWM section of the power control system wherein the second control signal is representative of a second state of the PWM signal.

19. The method of claim 16 further including coupling a third switch controller to drive a third power switch, driving in parallel a first control input of the third switch controller and the first control input of the first and second switch controllers with the first control signal;
   driving in parallel a second control input of the third switch controller and the second control input of the first and second switch controller with the second control signal; and
   driving a third control input of the third switch controller with a first control output of the first switch controller and driving a third control input of the second switch controller with a first control output of the third switch controller.

* * * * *